(12) United States Patent
Li et al.

(10) Patent No.: US 10,625,151 B2
(45) Date of Patent: Apr. 21, 2020

(54) METHOD FOR CONTROLLING GAME CHARACTER AND METHOD FOR CONTROLLING VIRTUAL CONTROL COMPONENT

(71) Applicant: NetEase (Hangzhou) Network Co., Ltd., Hangzhou, Zhejiang (CN)

(72) Inventors: Yan Li, Zhejiang (CN); Bin Li, Zhejiang (CN); Fei Xie, Zhejiang (CN); Long Xiao, Zhejiang (CN)

(73) Assignee: NETEASE (HANGZHOU) NETWORK CO., LTD., Hangzhou, Zhejiang (CN)

(*) Notice: Subject to any disclaimer, the term of this patent is extended or adjusted under 35 U.S.C. 154(b) by 0 days.

(21) Appl. No.: 15/910,678

(22) Filed: Mar. 2, 2018

(65) Prior Publication Data

US 2018/0185747 A1   Jul. 5, 2018

Related U.S. Application Data

(63) Continuation of application No. PCT/CN2016/097539, filed on Aug. 31, 2016.

(30) Foreign Application Priority Data

Sep. 2, 2015 (CN) .......................... 2015 1 0557247

(51) Int. Cl.
*A63F 13/2145* (2014.01)
*A63F 13/92* (2014.01)
(Continued)

(52) U.S. Cl.
CPC ........ *A63F 13/2145* (2014.09); *A63F 13/214* (2014.09); *A63F 13/426* (2014.09);
(Continued)

(58) Field of Classification Search
CPC .......................... A63F 13/214; A63F 13/2145
See application file for complete search history.

(56) References Cited

U.S. PATENT DOCUMENTS 8,678,927 B2 * 3/2014 Hammontree .......... A63F 13/06
463/37
2006/0052166 A1 * 3/2006 Ohta ....................... A63F 13/02
463/36

(Continued)

FOREIGN PATENT DOCUMENTS

CN    101853100 A    10/2010
CN    102886140 A     1/2013
(Continued)

OTHER PUBLICATIONS

International Search Report (English and Chinese) and Written Opinion issued in PCT/CN/2016/097539, dated Nov. 25, 2016, 10 pages.

(Continued)

*Primary Examiner* — Chase E Leichliter
(74) *Attorney, Agent, or Firm* — Hamre, Schumann, Mueller & Larson, P.C.

(57) ABSTRACT

The method for controlling a game character includes: obtaining a user initial indication position p1 in response to a screen-sliding operation of a user; monitoring a screen-sliding operation track of the user, and obtaining a user current indication position p2; calculating a moving distance between the user current indication position p2 and the user initial indication position p1 as |u|=|p2−p1|; comparing the moving distance |u| with a first preset threshold $S_1$; and generating, according to the vector u=p2−p1, an operating instruction for controlling the game character. By means of the control method, a user may control a game character without being restricted, and may perform more flexible and (Continued)

fluent operations, thereby greatly improving the user experience of a game.

11 Claims, 7 Drawing Sheets

(51) Int. Cl.
    *A63F 13/426* (2014.01)
    *A63F 13/214* (2014.01)
    *A63F 13/58* (2014.01)

(52) U.S. Cl.
    CPC .............. *A63F 13/58* (2014.09); *A63F 13/92* (2014.09); *A63F 2300/1075* (2013.01); *A63F 2300/204* (2013.01); *A63F 2300/64* (2013.01)

(56) References Cited

U.S. PATENT DOCUMENTS

| | | | |
|---|---|---|---|
| 2006/0121985 A1* | 6/2006 | Nakanishi | A63F 13/10 463/36 |
| 2008/0132333 A1 | 6/2008 | Kogo | |
| 2011/0172013 A1* | 7/2011 | Shirasaka | G06F 3/0488 463/37 |
| 2011/0276879 A1* | 11/2011 | Ando | G06F 3/0488 715/702 |
| 2011/0285636 A1* | 11/2011 | Howard | G06F 3/04815 345/173 |
| 2014/0066195 A1 | 3/2014 | Matsui et al. | |
| 2014/0302900 A1* | 10/2014 | Lee | A63F 13/10 463/4 |
| 2015/0057056 A1* | 2/2015 | Lee | A63F 13/426 463/2 |

FOREIGN PATENT DOCUMENTS

| | | |
|---|---|---|
| CN | 104066488 A | 9/2014 |
| CN | 105214306 A | 1/2016 |

OTHER PUBLICATIONS

Office Action issued in CN201510557247.8 dated Sep. 5, 2016, 5 pages.

* cited by examiner

METHOD FOR CONTROLLING GAME CHARACTER AND METHOD FOR CONTROLLING VIRTUAL CONTROL COMPONENT

CROSS REFERENCE TO RELATED APPLICATION

This application is a continuation application of PCT/CN2016/097539, filed on Aug. 31, 2016. The contents of PCT/CN2016/097539 are all hereby incorporated by reference.

TECHNICAL FIELD

The present invention relates to the field of games, and in particular, to a method for controlling a game character and a method for controlling a virtual control component.

BACKGROUND

In games such as action role-playing games (ARPG) and first person shooter (FPS) games on mobile terminals, users usually need to control directions and operations such as motions of roles. An existing common setting is to virtually set a button virtual joystick on a screen of a touchscreen mobile terminal, to perform direct operation for a game. When an object needs to be controlled to move towards a direction, the virtual joystick is tapped and controlled to slide towards the direction. An undiversified status makes an operation on the virtual joystick rigid and unnatural, and a user cannot experience the feeling of operating an actual joystick. In addition, in a tense fight, the limitation of the virtual joystick increases the misoperation rate of the user, greatly reducing the fluency of the game.

SUMMARY

To resolve the foregoing technical problems, the embodiments of the present application disclose a method for controlling a game character and a method for controlling a virtual control component, so that a user controls a game character without being restricted and performs more flexible and fluent operations, thereby greatly improving the user experience of a game.

To achieve the foregoing objective, the following technical solutions are used in the embodiments of the present application:

The embodiments of the present application disclose a method for controlling a game character, comprising the following steps:

A1. an initial-coordinate obtaining step: obtaining a user initial indication position p1 in response to a screen-sliding operation of a user;

A2. a screen-sliding track monitoring step: monitoring a screen-sliding operation track of the user, and obtaining a user current indication position p2;

A3. a calculation step: calculating a moving distance between the user current indication position p2 and the user initial indication position p1 as $|u|=|p2-p1|$;

A4. an updating step: comparing the moving distance $|u|$ with a first preset threshold $S_1$, when the moving distance $|u|$ is greater than the first preset threshold $S_1$, calculating a new position via $p1'=p2-(p2-p1)/|u|*S_1*k$, where k is a preset constant and $k>0$, and updating the user initial indication position p1 to the new position p1'; and A5. a control-instruction generation step: generating, according to the vector $u=p2-p1$, an operating instruction for controlling the game character.

In some embodiments, the generating, according to the vector u, an operating instruction for controlling the game character in the step A5 comprises the following steps:

comparing the moving distance $|u|$ with a second preset threshold $S_2$; and if $|u|<S_2$, generating a first operating instruction for controlling the game character: the controlled game character moves at a first velocity $v_1$, where the velocity $v_1$ is codirectional with the vector u; or if $|u|\geq S_2$, generating a second operating instruction for controlling the game character: the controlled game character moves at a second velocity $v_2$, where the velocity $v_2$ is codirectional with the vector u, where $$|v_2|>|v_1|.$$

In some embodiments, the generating, according to the vector u, an operating instruction for controlling the game character in the step A5 comprises the following steps:

comparing the moving distance $|u|$ with N preset thresholds $Q_1, Q_2, Q_3, \ldots, Q_{N-1}$, and $Q_N$, where $N\geq 3$; and if $|u|<Q_1$, generating a first operating instruction for controlling the game character: the controlled game character moves at a first velocity $v_1$, where the velocity $v_1$ is codirectional with the vector u; or if $Q_1\leq|u|<Q_2$, generating a second operating instruction for controlling the game character: the controlled game character moves at a second velocity $v_2$, where the velocity $v_2$ is codirectional with the vector u; or if $Q_2\leq|u|<Q_3$, generating a third operating instruction for controlling the game character: the controlled game character moves at a third velocity $v_3$, where the velocity $v_3$ is codirectional with the vector u; or

. . .

if $Q_{N-1}\leq|u|<Q_N$, generating an $N^{th}$ operating instruction for controlling the game character: the controlled game character moves at an $N^{th}$ velocity $v_N$, where the velocity $v_N$ is codirectional with the vector u; or if $|u|\geq Q_N$, generating an $(N+1)^{th}$ operating instruction for controlling the game character: the controlled game character moves at an $(N+1)^{th}$ velocity $v_{N+1}$, where the velocity $v_{N+1}$ is codirectional with the vector u, where $$|v_{N+1}|\geq|v_N|> \ldots >|v_3|>|v_2|>|v_1|.$$

Further, $|v_1|=0$.

In some embodiments, the operating instruction in the step A5 comprises: the controlled game character moves at a velocity $v=w*|u|$, where w is a preset correlation coefficient, and the velocity v is codirectional with the vector u.

In some embodiments, the operating instruction in the step A5 comprises: the controlled game character moves at a preset velocity, and the value of at least one attribute parameter of the controlled game character has a positive correlation with $|u|$.

Further, attribute parameters of the controlled game character comprise: vitality, an attack power, a defensive power, and sensitivity.

Further, the step A1 further comprises: providing a first visual reference identifier used by the user for observing coordinates of the user initial indication position p1.

Further, the step A2 further comprises: providing a second visual reference identifier used by the user for observing coordinates of the user current indication position p2.

Further, the screen-sliding operation is a continuous control action on an electronic apparatus, which comprises, but is not limited to, an action of touching and continuous sliding on a touchscreen, an action of clicking and dragging of a mouse, and continuous sensing and sliding of a sensing operation.

The embodiments of the present application further disclose a method for controlling a virtual control component, the virtual control component being used for controlling a game character, where the virtual control component comprises a base and an operation portion, and the control method comprises the following steps:

B1. a virtual-control-component creating step: creating the virtual control component, and presetting positions of the base and the operation portion as an initial position;

B2. an initial-coordinate obtaining step: obtaining a user initial indication position p1 in response to a screen-sliding operation of a user, and moving the positions of the base and the operation portion to the user initial indication position p1;

B3. a screen-sliding track monitoring step: monitoring a screen-sliding operation track of the user, and obtaining a user current indication position p2, and moving the operation portion with the screen-sliding operation track;

B4. a calculation step: calculating a moving distance between the user current indication position p2 and the user initial indication position p1 as $|u|=|p2-p1|$;

B5. an updating step: comparing the moving distance $|u|$ with a preset threshold $S_1$, when the moving distance $|u|$ is greater than the preset threshold $S_1$, calculating a new position via $p1'=p2-(p2-p1)/|u| *S_1*k$, where k is a preset constant and k>0, updating the user initial indication position p1 to the new position p1', and moving the position of the base to the new position p1'; and B6. a control-instruction generation step: generating, according to the vector $u=p2-p1$, an operating instruction for controlling the game character.

The positions of the base and the operation portion are respectively coordinates of logical centers of the base and the operation portion.

Further, the control step further comprises:

B7. ending the control: setting a velocity of the controlled game character to 0 in response to ending of the screen-sliding operation, and moving the positions of the base and the operation portion to the initial position.

In some embodiments, the generating, according to the vector u, an operating instruction for controlling the game character in the step B6 comprises the following steps:

comparing the moving distance $|u|$ with a second preset threshold $S_2$; and if $|u|<S_2$, generating a first operating instruction for controlling the game character: the controlled game character moves at a first velocity $v_1$, where the velocity $v_1$ is codirectional with the vector u; or if $|u| \geq S_2$, generating a second operating instruction for controlling the game character: the controlled game character moves at a second velocity $v_2$, where the velocity $v_2$ is codirectional with the vector u, where $$|v_2|>|v_1|.$$

In some embodiments, the generating, according to the vector u, an operating instruction for controlling the game character in the step B6 comprises the following steps:

comparing the moving distance $|u|$ with N preset thresholds $Q_1, Q_2, Q_3, \ldots, Q_{N-1}$, and $Q_N$, where $N \geq 3$; and if $|u|<Q_1$, generating a first operating instruction for controlling the game character: the controlled game character moves at a first velocity $v_1$, where the velocity $v_1$ is codirectional with the vector u; or if $Q_1 \leq |u|<Q_2$, generating a second operating instruction for controlling the game character: the controlled game character moves at a second velocity $v_2$, where the velocity $v_2$ is codirectional with the vector u; or if $Q_2 \leq |u|<Q_3$, generating a third operating instruction for controlling the game character: the controlled game character moves at a third velocity $v_3$, where the velocity $v_3$ is codirectional with the vector u; or

. . .

if $Q_{N-1} \leq |u|<Q_N$, generating an $N^{th}$ operating instruction for controlling the game character: the controlled game character moves at an $N^{th}$ velocity $v_N$, where the velocity $v_N$ is codirectional with the vector u; or if $|u| \geq Q_N$, generating an $(N+1)^{th}$ operating instruction for controlling the game character: the controlled game character moves at an $(N+1)^{th}$ velocity $v_{N+1}$, where the velocity $v_{N+1}$ is codirectional with the vector u, where $$|v_{N+1}| \geq |v_N| > \ldots > |v_3|>|v_2|>|v_1|.$$

Further, $|v_1|=0$.

In some embodiments, the operating instruction in the step B6 comprises: the controlled game character moves at a velocity $v=w*|u|$, where w is a preset correlation coefficient, and the velocity v is codirectional with the vector u.

In some embodiments, the operating instruction in the step B6 comprises: the controlled game character moves at a preset velocity, and the value of at least one attribute parameter of the controlled game character has a positive correlation with $|u|$.

Further, attribute parameters of the controlled game character comprise: vitality, an attack power, a defensive power, and sensitivity.

Compared with the prior art, the embodiments of the present application may have the following beneficial effects: In the embodiments of the present application, the screen-sliding operation of the user and the track of the screen-sliding operation are obtained to determine the user initial indication position p1 and the user current indication position p2; the moving distance $|u|$ between the two is compared with the first preset threshold $S_1$; when the moving distance $|u|$ is greater than the first preset threshold $S_1$, the user initial indication position p1 is updated, so that the user initial indication position p1 conditionally slides with the screen-sliding operation of the user. Therefore, the user may control the game character without being restricted, and may perform more flexible and fluent operations. In addition, compared with the prior art in which sliding needs to be performed around an original user initial indication position when a user needs to change a direction of a game character, in the embodiments of the present application, sliding only needs to be performed around an updated user initial indication position, so that a distance by which sliding needs to be performed when the game character changes the direction is greatly shortened, and the user may perform more convenient and flexible operations in a control process, thereby greatly improving the user experience.

In a further solution, the velocity of the game character may be divided into two segmentations according to the comparison between the moving distance $|u|$ and the second preset threshold $S_2$. Alternatively, the velocity of the game character may be divided into a plurality of dispersed segmentations according to the comparison between the moving distance $|u|$ and the N preset thresholds. Alternatively, the parameter of the game character is made have a position correlation with the moving distance $|u|$. For example, the velocity of the game character is directly proportional to the moving distance |u|. As the moving distance |u| increases, the velocity of the game character becomes larger, so as to satisfy various requirements of various user. By means of the operation methods, the user performs more flexible operations in a process of controlling the game character, thereby increasing the sense of reality of controlling the game character, and further improving the user experience.

In the method for controlling a virtual control component in the embodiments of the present application, the virtual control component is divided into the base and the operation portion. The position of the base moves with the screen-sliding operation track of the user, so as to help the user to observe the coordinates of the initial indication position p1 and the user current indication position p2, and help the user to observe an operation on the game character.

DETAILED DESCRIPTION

The present application is described in further detail below with reference to the accompanying drawings and preferred embodiments.

A screen-sliding operation in the present application is a continuous control action on an electronic apparatus, which comprises, but is not limited to, an action of touching and continuous sliding on a touchscreen, an action of clicking and dragging of a mouse, continuous sensing and sliding of a sensing operation, and the like. An indication position comprises, but is not limited to, a touch position, a mouse click position, a sensing operation position, and the like.

Figure 1:
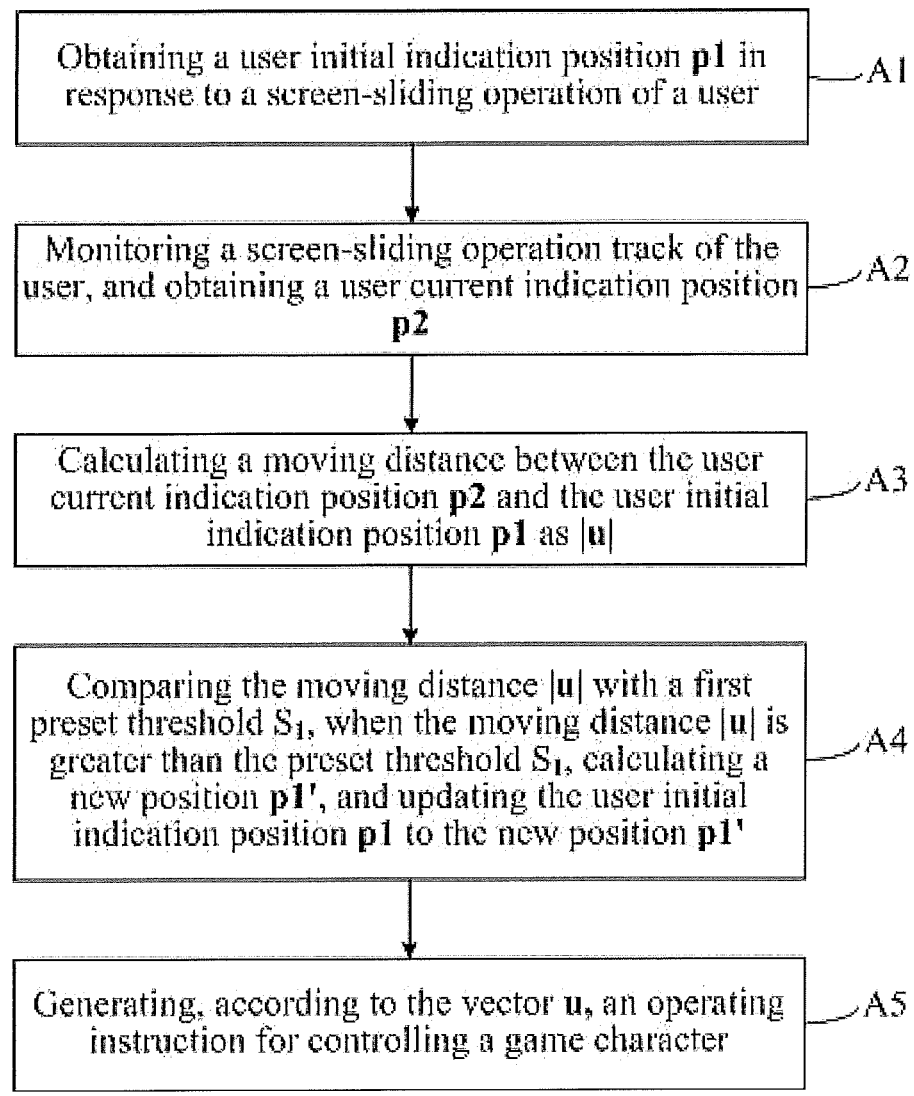
FIG. 1 is a flowchart of a method for controlling a game character according to the present application.

As shown in FIG. 1, the present application discloses a method for controlling a game character, comprising the following steps:

A1. an initial-coordinate obtaining step: Obtaining a user initial indication position p1 in response to a screen-sliding operation of a user.

A2. a screen-sliding track monitoring step: Monitoring a screen-sliding operation track of the user, and obtaining a user current indication position p2.

A3. a calculation step: Calculating a moving distance between the user current indication position p2 and the user initial indication position p1 as $|u|=|p2-p1|$.

A4. an updating step: Comparing the moving distance |u| with a first preset threshold $S_1$, when the moving distance |u| is greater than the preset threshold $S_1$, calculating a new position via $p1'=p2-(p2-p1)/|u|*S_1*k$, where k is a preset constant and k>0, and updating the user initial indication position p1 to the new position p1'.

A5. a control-instruction generation step: Generating, according to the vector u=p2−p1, an operating instruction for controlling the game character.

In some preferred embodiments, the generating, according to the vector u, an operating instruction for controlling the game character in step A5 comprises the following steps:
comparing the moving distance |u| with a preset threshold $S_2$; and
if $|u|<S_2$, generating a first operating instruction for controlling the game character: the controlled game character moves at a first velocity $v_1$, where the velocity $v_1$ is codirectional with the vector u; or
if $|u| \geq S_2$, generating a second operating instruction for controlling the game character: the controlled game character moves at a second velocity $v_2$, where the velocity $v_2$ is codirectional with the vector u, where $$|v_2|>|v_1|.$$

In some preferred embodiments, the generating, according to the vector u, an operating instruction for controlling the game character in step A5 comprises the following steps:
comparing the moving distance |u| with N preset thresholds $Q_1, Q_2, Q_3, \ldots, Q_{N-1}$, and $Q_N$, where N≥3; and
if $|u|<Q_1$, generating a first operating instruction for controlling the game character: the controlled game character moves at a first velocity $v_1$, where the velocity $v_1$ is codirectional with the vector u; or
if $Q_1 \leq |u| < Q_2$, generating a second operating instruction for controlling the game character: the controlled game character moves at a second velocity $v_2$, where the velocity $v_2$ is codirectional with the vector u; or
if $Q_2 \leq |u| < Q_3$, generating a third operating instruction for controlling the game character: the controlled game character moves at a third velocity $v_3$, where the velocity $v_3$ is codirectional with the vector u; or
. . .
if $Q_{N-1} \leq |u| < Q_N$, generating an $N^{th}$ operating instruction for controlling the game character: the controlled game character moves at an $N^{th}$ velocity $v_N$, where the velocity $v_N$ is codirectional with the vector u; or
if $|u| \geq Q_N$, generating an $(N+1)^{th}$ operating instruction for controlling the game character: the controlled game character moves at an $(N+1)^{th}$ velocity $v_{N+1}$, where the velocity $v_{N+1}$ is codirectional with the vector u, where $$|v_{N+1}| \geq |v_N| > \ldots > |v_3| > |v_2| > |v_1|.$$

Further, $|v_1|=0$. When the moving distance |u| is less than the preset threshold $Q_1$, the velocity of the controlled game character is set to 0, so as to avoid a misoperation of the user. The preset threshold $Q_1$ is set to a distance range of a misoperation of the user, so that a screen-sliding operation behavior of the user is more accurately recorded, thereby reducing the misoperation rate of the user, and improving the user experience.

In some preferred embodiments, the operating instruction in step A5 comprises: the controlled game character moves at a velocity $v=w*|u|$, where w is a preset correlation coefficient, and the velocity v is codirectional with the vector u.

In some preferred embodiments, the operating instruction in step A5 comprises: the controlled game character moves at a preset velocity, and the value of at least one attribute parameter of the controlled game character has a positive correlation with |u|. Attribute parameters of the controlled game character comprise: vitality, an attack power, a defensive power, and sensitivity.

In a preferred embodiment, step A1 further comprises: providing a first visual reference identifier used by the user for observing coordinates of the user initial indication position p1. Further, step A2 further comprises: providing a second visual reference identifier used by the user for observing coordinates of the user current indication position p2.

Figure 2:
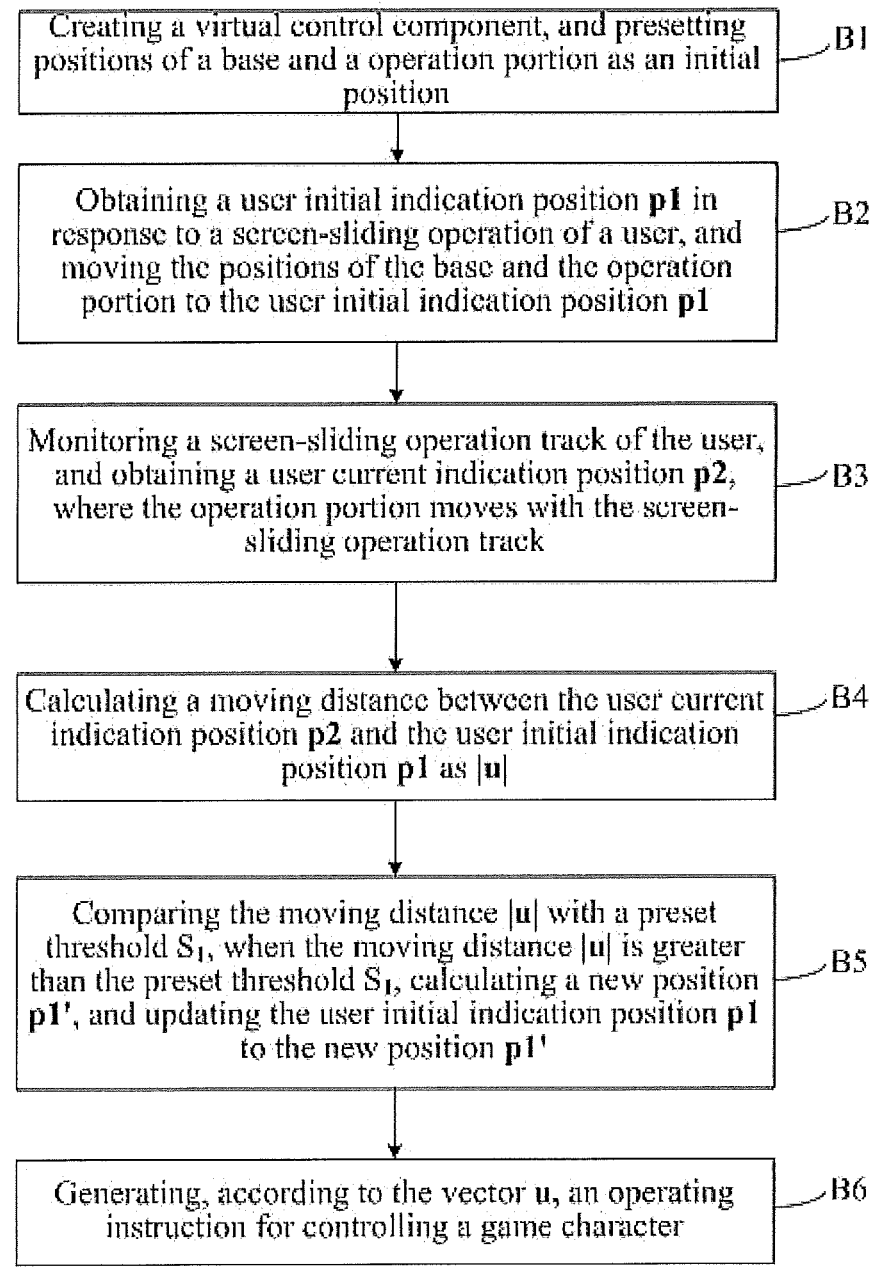
FIG. 2 is a flowchart of a method for controlling a virtual control component according to the present application.

As shown in FIG. 2, the present application further discloses a method for controlling a virtual control component, the virtual control component being used for controlling a game character, where the virtual control component comprises a base and an operation portion, and the control method comprises the following steps:

B1. a virtual-control-component creating step: Creating the virtual control component, and presetting positions of the base and the operation portion as an initial position.

B2. an initial-coordinate obtaining step: Obtaining a user initial indication position p1 in response to a screen-sliding operation of a user, and moving the positions of the base and the operation portion to the user initial indication position p1.

B3. a screen-sliding track monitoring step: Monitoring a screen-sliding operation track of the user, and obtaining a user current indication position p2, and moving the operation portion with the screen-sliding operation track.

B4. a calculation step: Calculating a moving distance between the user current indication position p2 and the user initial indication position p1 as $|u|=|p2-p1|$.

B5. an updating step: Comparing the moving distance |u| with a preset threshold $S_1$, when the moving distance |u| is greater than the preset threshold $S_1$, calculating a new position via $p1'=p2-(p2-p1)/|u|*S_1*k$, where k is a preset constant and k>0, updating the user initial indication position p1 to the new position p1', and moving the position of the base to the new position p1'.

B6. a control-instruction generation step: Generating, according to the vector $u=p2-p1$, an operating instruction for controlling the game character.

The positions of the base and the operation portion are respectively coordinates of logical centers of the base and the operation portion.

In a preferred embodiment, the control step further comprises: B7. ending the control: setting a velocity of the controlled game character to 0 in response to ending of the screen-sliding operation, and moving the positions of the base and the operation portion to the initial position.

In some preferred embodiments, the generating, according to the vector u, an operating instruction for controlling the game character in step B6 comprises the following steps:

comparing the moving distance |u| with a second preset threshold $S_2$; and if $|u|<S_2$, generating a first operating instruction for controlling the game character: the controlled game character moves at a first velocity $v_1$, where the velocity $v_1$ is codirectional with the vector u; or if $|u|\geq S_2$, generating a second operating instruction for controlling the game character: the controlled game character moves at a second velocity $v_2$, where the velocity $v_2$ is codirectional with the vector u, where $$|v_2|>|v_1|.$$

In some preferred embodiments, the generating, according to the vector u, an operating instruction for controlling the game character in step B6 comprises the following steps:

comparing the moving distance |u| with N preset thresholds $Q_1, Q_2, Q_3, \ldots, Q_{N-1}$, and $Q_N$, where $N\geq 3$; and if $|u|<Q_1$, generating a first operating instruction for controlling the game character: the controlled game character moves at a first velocity $v_1$, where the velocity $v_1$ is codirectional with the vector u; or if $Q_1\leq|u|<Q_2$, generating a second operating instruction for controlling the game character: the controlled game character moves at a second velocity $v_2$, where the velocity $v_2$ is codirectional with the vector u; or if $Q_2\leq|u|<Q_3$, generating a third operating instruction for controlling the game character: the controlled game character moves at a third velocity $v_3$, where the velocity $v_3$ is codirectional with the vector u; or

. . .

if $Q_{N-1}\leq|u|<Q_N$, generating an $N^{th}$ operating instruction for controlling the game character: the controlled game character moves at an $N^{th}$ velocity $v_N$, where the velocity $v_N$ is codirectional with the vector u; or if $|u|\geq Q_N$, generating an $(N+1)^{th}$ operating instruction for controlling the game character: the controlled game character moves at an $(N+1)^{th}$ velocity $v_{N+1}$, where the velocity $v_{N+1}$ is codirectional with the vector u, where $$|v_{N+1}|\geq |v_N|> \ldots >|v_3|>|v_2|>|v_1|.$$

Further, $|v_1|=0$

In some preferred embodiments, the operating instruction in step B6 comprises: the controlled game character moves at a velocity $v=w*|u|$, where w is a preset correlation coefficient, and the velocity v is codirectional with the vector u.

In some preferred embodiments, the operating instruction in step B6 comprises: the controlled game character moves at a preset velocity, and the value of at least one attribute parameter of the controlled game character has a positive correlation with |u|. Further, attribute parameters of the controlled game character comprise: vitality, an attack power, a defensive power, and sensitivity.

Figure 3:
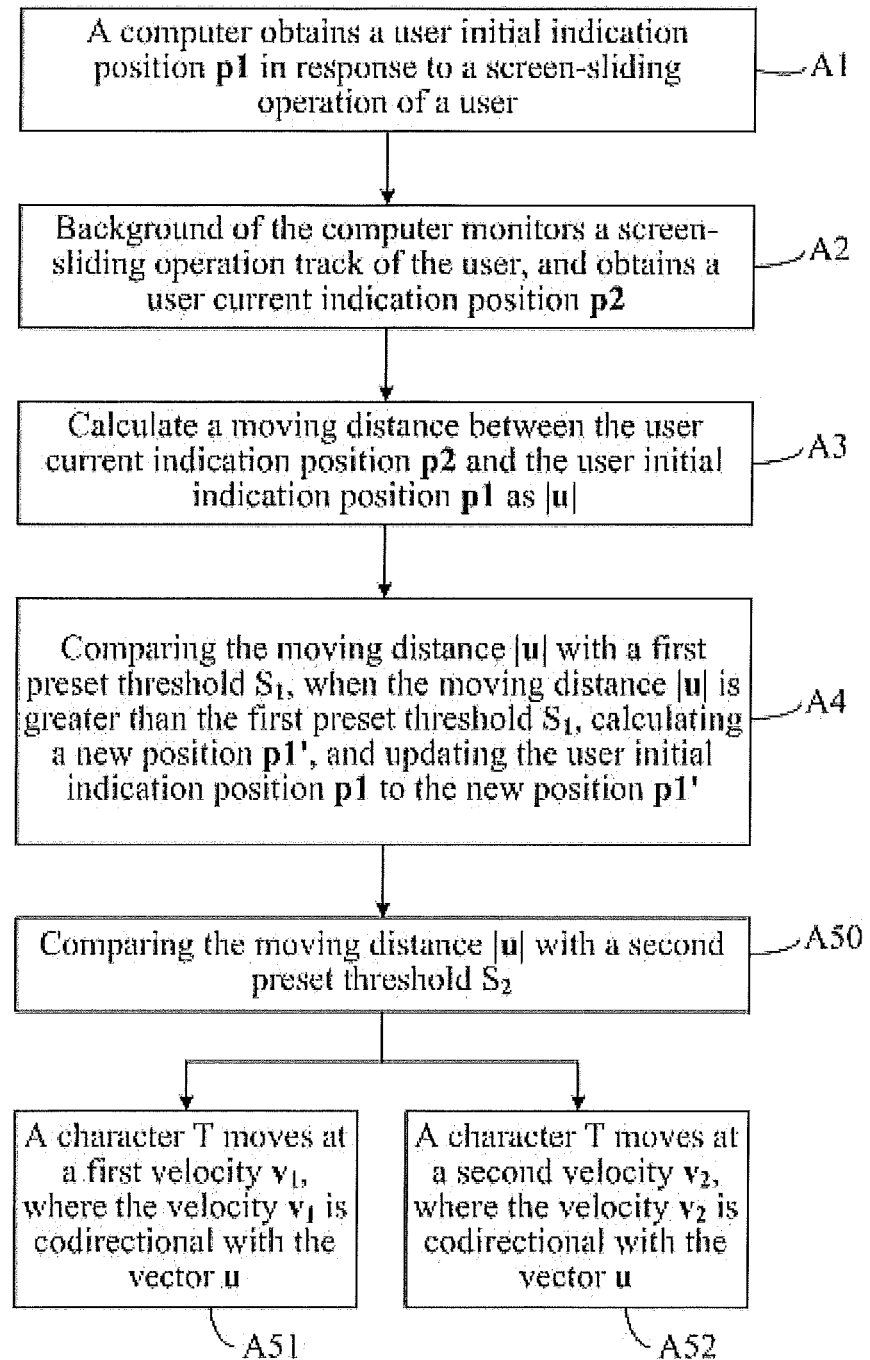
FIG. 3 is a flowchart of control in a method for controlling a game character according to Embodiment 1 of the present application.

As shown in FIG. 3, FIG. 3 is a flowchart of a method for controlling a game character according to Embodiment 1 of the present application. In this embodiment, a user controls a character T in a game on a computer. The control method comprises the following steps:

A1. The computer receives a screen-sliding operation of the user, and obtains an initial indication position p1 of the user in response to the screen-sliding operation of the user, where a first visual reference identifier is set on the computer and used by the user for observing coordinates of the initial indication position p1.

A2. Background of the computer monitors a screen-sliding operation track of the user, obtains a current indication position p2 of the user, where a second visual reference identifier is set on the computer and used by the user for observing coordinates of the current indication position p2.

A3. Calculating a moving distance between the current indication position p2 of the user and the initial indication position p1 of the user as $|u|=|p2-p|$.

A4. Comparing the moving distance |u| with a first preset threshold $S_1$, when the moving distance |u| is greater than the first preset threshold $S_1$, calculating a new position via $p1'=p2-(p2-p1)/|u|*S_1*k$, where k is a preset constant and k>0, and updating the user initial indication position p1 to the new position p1'.

A50. Comparing the moving distance |u| with a second preset threshold $S_2$, and if $u<S_2$, performing step A51; or if $|u|\geq S_2$, perform step A52.

A51. Generating a first operating instruction for the character T: the character T moves at a first velocity $v_1$, where the velocity $v_1$ is codirectional with the vector u.

A52. Generating a second operating instruction for the character T: the character T moves at a second velocity $v_2$, where the velocity $v_2$ is codirectional with the vector u, and $|v_2|>|v_1|$.

When step A51 or step A52 is performed, the value of at least one attribute parameter of the character T has a positive correlation with the moving distance $|u|$, and attribute parameters of the character T comprise, but is not limited to, vitality, an attack power, a defensive power, and sensitivity.

In this embodiment, the screen-sliding operation is actions of clicking and dragging of a mouse, and the indication position is a mouse click position.

During practical application, $v_1$, $v_2$, and k may be set according to a requirement and may be dynamically changed, to meet a flexible control requirement. In this embodiment, controlling of the game character is set to two segmentations. When the moving distance $|u|$ is less than the second preset threshold $S_2$, the character T moves at a relatively small velocity. When the moving distance $|u|$ is greater than the second preset threshold $S_2$, the character T moves at a relatively large velocity. The movement of character T corresponds to different feedbacks in cases of different moving distances, so that the character T is more flexibly controlled, thereby improving the sense of reality of motion of the character T.

Figure 4:
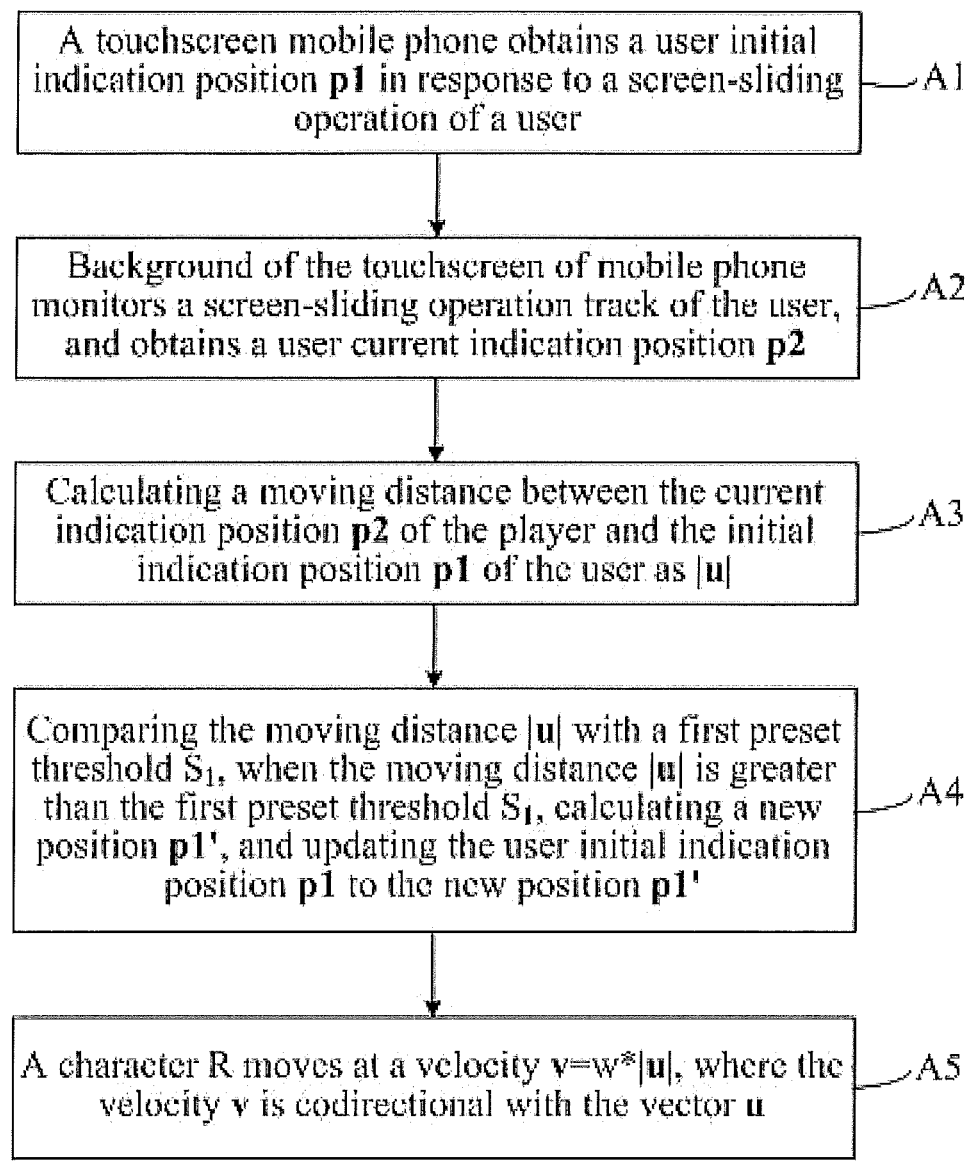
FIG. 4 is a flowchart of control in a method for controlling a game character according to Embodiment 2 of the present application.

As shown in FIG. 4, FIG. 4 is a flowchart of a method for controlling a game character according to Embodiment 2 of the present application. In this embodiment, a user controls a character R in a game on a touchscreen of mobile phone. The control method comprises the following steps:

A1. The touchscreen of mobile phone receives a screen-sliding operation of the user, and obtains an initial indication position p1 of the user in response to the screen-sliding operation of the user.

A2. Background of the touchscreen of mobile phone monitors a screen-sliding operation track of the user, and obtains a current indication position p2 of the user.

A3. Calculating a moving distance between the current indication position p2 of the user and the initial indication position p1 of the user as $|u|=|p2-p1|$.

A4. Comparing the moving distance $|u|$ with a first preset threshold $S_1$, when the moving distance $|u|$ is greater than the first preset threshold $S_1$, calculating a new position via $p1'=p2-(p2-p1)/|u|*S_1*k$, where k is a preset constant and k>0, and updating the user initial indication position p1 to the new position p1'.

A5. The character R moves at a velocity $v=w*|u|$, where w is a preset correlation coefficient, and the velocity v is codirectional with the vector u.

When step A5 is performed, the value of at least one attribute parameter of the character R has a positive correlation with the moving distance $|u|$, and the attribute parameters of the character R comprise, but is not limited to, vitality, an attack power, a defensive power, and sensitivity.

In this embodiment, the screen-sliding operation is an action of touching and continuous sliding, and the indication position is a touch position of a user.

During practical application, k and w may be set according to a requirement and may be dynamically changed, to meet a flexible control requirement. In this embodiment, control of the game character is set to be continuously changed, so that the moving velocity v of the character R is directly proportional to the moving distance $|u|$. A larger moving distance $|u|$ indicates a larger moving velocity v of the character R. Therefore, the movement of character R corresponds to different feedbacks in cases of different moving distances, so that the character R is more flexibly controlled, thereby improving the sense of reality of motion of the character R.

Figure 5:
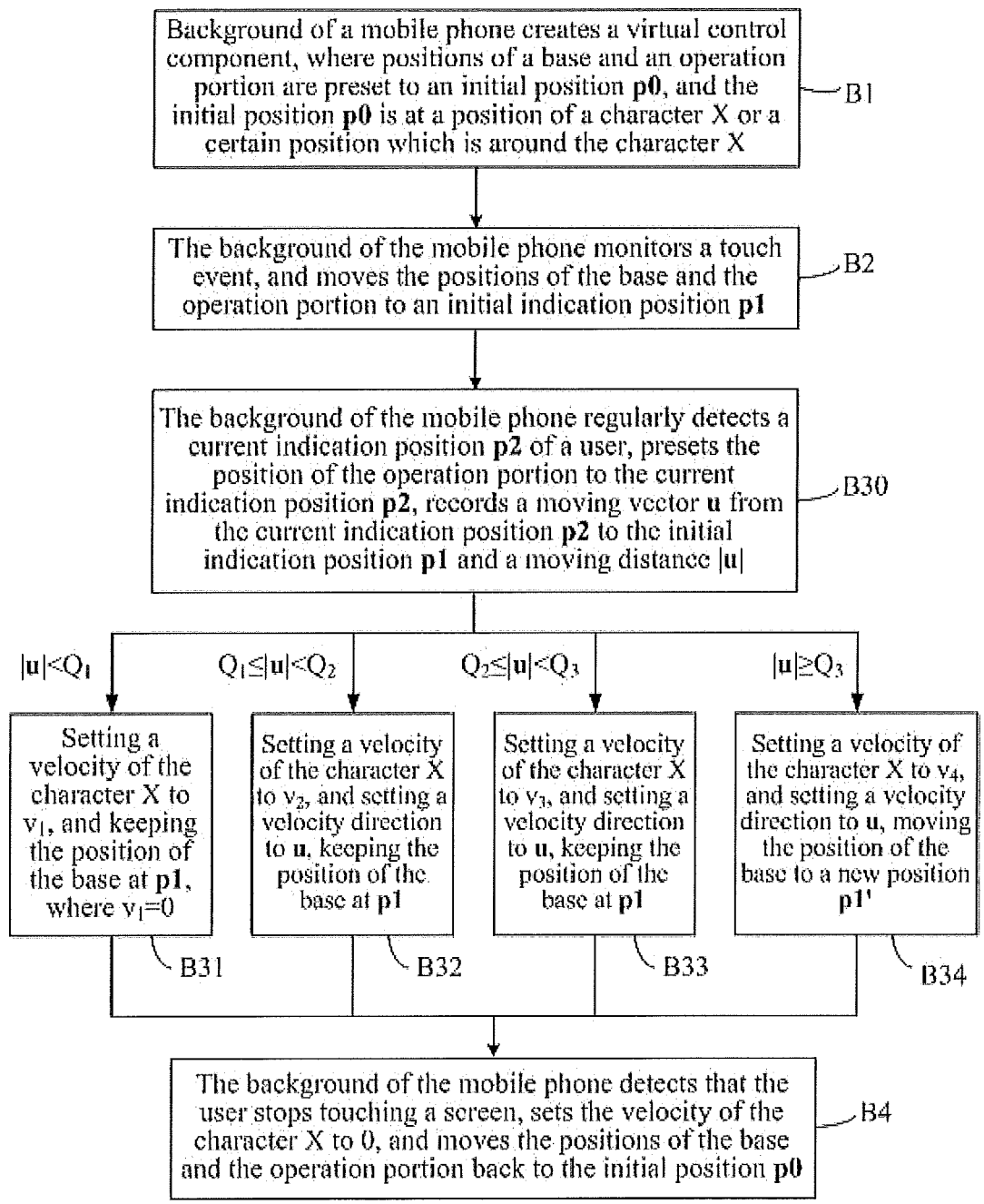
FIG. 5 is a flowchart of controlling a virtual control component according to Embodiment 3 of the present application.

As shown in FIG. 5, FIG. 5 is a flowchart of a method for controlling a virtual control component according to Embodiment 3 of the present application. In this embodiment, the virtual control component is used by a user for controlling a character X in a game on a touchscreen of mobile phone. The virtual control component comprises a base and an operation portion, and the control method comprises the following steps:

B1, and the initial position p0 is at a position of the character X or a certain position which is around the character X.

B2. The background of the mobile phone monitors a touch event, and when the user performs a touch-and-press operation in an initial indication position p1 within a range of a mobile phone screen, moves the positions of the base and the operation portion to the initial indication position p1.

B30: During a period of continuously touching the mobile phone screen by the user, the background of the mobile phone regularly detects a current indication position p2 of the user, presets the position of the operation portion to the current indication position p2, records a moving vector u from the current indication position p2 to the initial indication position p1 and a moving distance $|u|$, where $u=p2-p1$, and $|u|=|p2-p1|$, and compares the absolute value $|u|$ of the moving distance with preset thresholds $Q_1$, $Q_2$, and $Q_3$, which further comprising:

B31. When $|u|<Q_1$, setting a velocity of the character X to $v_1$, keeping the position of the base at the initial indication position p1, where $v_1=0$.

B32. When $Q_1 \le |u| < Q_2$, setting a velocity of the character X to $v_2$, and setting a velocity direction of the character X to u, keeping the position of the base at the initial indication position p1.

B33. When $Q_2 \le |u| < Q_3$, setting a velocity of the character X to $v_3$, and setting a velocity direction of the character X to u, keeping the position of the base at the initial indication position p1.

B34. When $|u| \ge Q_3$, setting a velocity of the character X to $v_4$, and setting a velocity direction of the character X to u, moving the position of the base to a new position p1', where $p1'=p2-u/|u|*Q_3$, and updating the initial indication position p1 to the new position p1'.

B4. The background of the mobile phone detects that the user stops touching the screen, sets the velocity of the character X to 0, and moves the positions of the base and the operation portion back to the initial position p0.

In this embodiment, the indication position is a touch position of a user, the positions of the operation portion of the virtual control component are respectively a first visual reference identifier and a second visual reference identifier that are used by the user for observing coordinates of the user initial indication position p1 and the user current indication position p2.

In this embodiment, setting $v_1$ to 0 is aiming to avoid a misoperation of the user, and a preset value $S_1$ is set to a distance range of a misoperation of the user, so that a touch behavior of the user is more accurately recorded, the misoperation rate of the user will be reduced, and accordingly the user experience will be improved.

In this embodiment, the first preset threshold $S_1$ is equal to the preset threshold $Q_3$.

During practical application, $Q_1$, $Q_2$, $Q_3$, $v_2$, $v_3$, and $v_4$ may be set according to a requirement and may be dynamically changed, to meet a flexible control requirement. In some embodiments, $v_2 < v_3 = v_4$. In this embodiment, controlling of the virtual control component is set to three segmentations, which discretely controlling in different statuses. Such as: when a moving distance of the user is in the range of 0 through $Q_1$, the base or the character X does not move in this condition; when the moving distance is in the range of $Q_1$ through $Q_2$, the base does not move and the character X moves at the velocity $v_2$; when the distance is in the range of $Q_2$ through $Q_3$, the base does not move and the character X moves at the velocity $v_3$; when the distance is greater than or equal to $Q_3$, the character X moves at the velocity $v_4$ and the base moves with the operation portion. The movement of character X corresponds to different feedbacks in cases of different moving distances. A larger moving distance may indicate a larger velocity of the character X, so that a control status of a real joystick is more accurately simulated, thereby improving the sense of reality of the virtual control component, and increasing the flexibility of the virtual control component.

The preset values $Q_1$, $Q_2$, and $Q_3$ are determined according to an operation habit and a comfort level of the user, and may be customized based on different individuals. For example, $Q_1$=36 pixels, $Q_2$=90 pixels, and $Q_3$=100 pixels.

Figure 6:
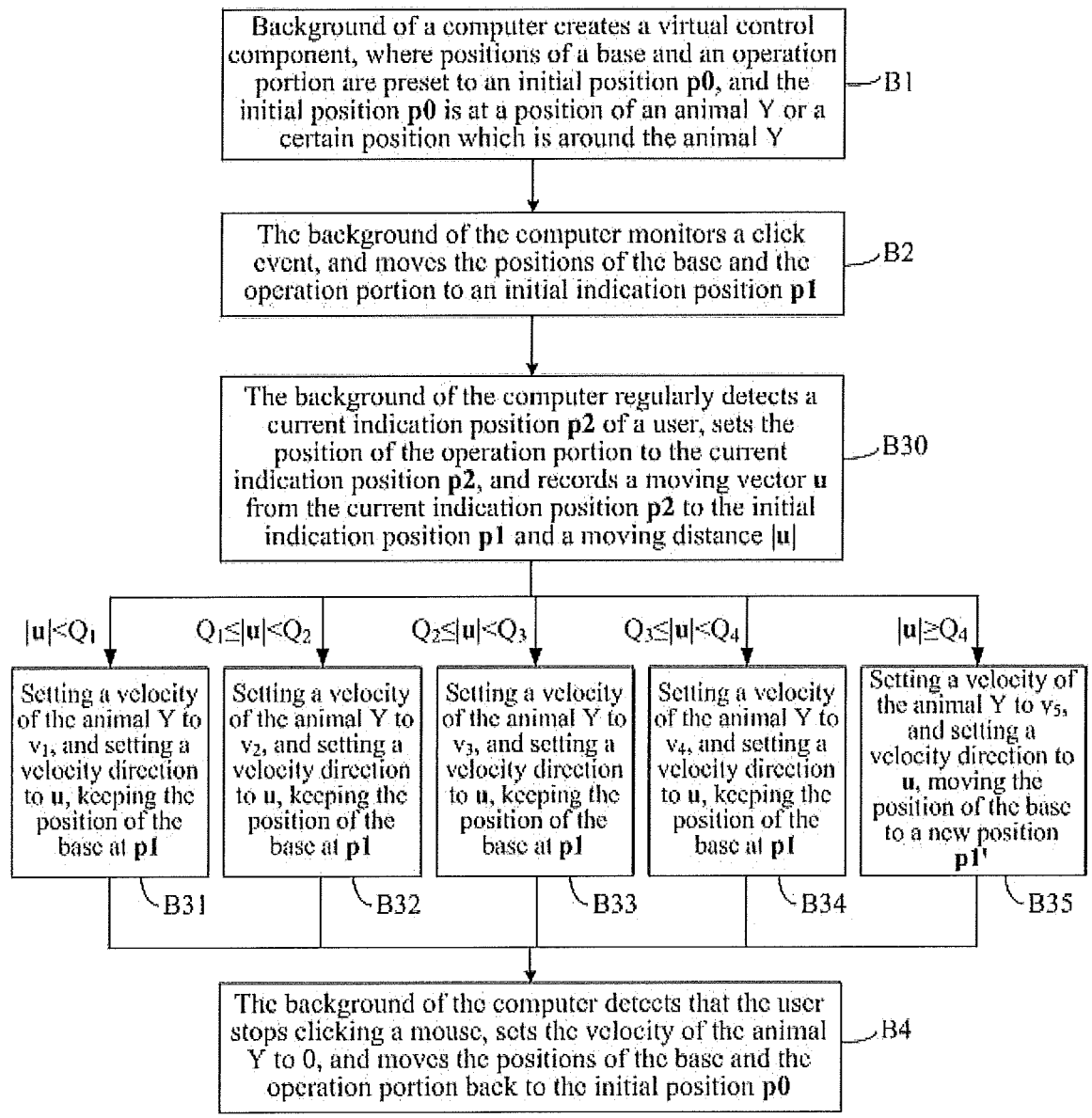
FIG. 6 is a flowchart of controlling a virtual control component according to Embodiment 4 of the present application.

As shown in FIG. 6, FIG. 6 is a flowchart of a method for controlling a virtual control component according to Embodiment 4 of the present application. In this embodiment, the virtual control component is used by a user for controlling an animal Y in a game on a computer by means of clicking and moving of a mouse. The virtual control component comprises a base and an operation portion, and the control method comprises the following steps:

B1, and the initial position p0 is at a position of the animal Y or a certain position which is around the animal Y.

B2. The background of the computer monitors a mouse click event, and when the user performs clicking in an initial indication position p1 within a game response area of the computer, moves the positions of the base and the operation portion to the initial indication position p1.

B30. During a period of clicking a computer screen by the user by using a mouse, the background of the computer regularly detects a current indication position p2 of the user, presets the position of the operation portion to the current indication position p2, records a moving vector u from the current indication position p2 to the initial indication position p1 and a moving distance |u|, where u=p2−p1, and |u|=|p2−p1|, and compares the moving distance |u| with preset thresholds $Q_1$, $Q_2$, $Q_3$, and $Q_4$, which further comprising:

B31. When $|u|<Q_1$, setting a velocity of the animal Y to $v_1$, and setting a velocity direction of the animal Y to u, keeping the position of the base at the initial indication position p1.

B32. When $Q_1 \le |u| < Q_2$, setting a velocity of the animal Y to $v_2$, and setting a velocity direction of the animal Y to u, keeping the position of the base at the initial indication position p1.

B33. When $Q_2 \le |u| < Q_3$, setting a velocity of the animal Y to $v_3$, and setting a velocity direction of the animal Y to u, keeping the position of the base at the initial indication position p1.

B34. When $Q_3 \le |u| < Q_4$, setting a velocity of the animal Y to $v_4$, and setting a velocity direction of the animal Y to u, keeping the position of the base at the initial indication position p1.

B35. When $|u| \ge Q_4$, setting a velocity of the animal Y to $v_5$, and setting a velocity direction of the animal Y to u, moving the position of the base to a new position p1', where p1'=p2−u/|u|*$S_3$*k, and k is a preset constant and k>0, and updating the initial indication position p1 to the new position p1'.

B4. The background of the computer detects that the user stops clicking the mouse, sets the velocity of the animal Y to 0, and moves the positions of the base and the operation portion back to the initial position p0.

In this embodiment, the indication position is a position clicked by the user by using the mouse, the positions of the operation portion of the virtual control component are respectively a first visual reference identifier and a second visual reference identifier that are used by the user for observing coordinates of the user initial indication position p1 and the user current indication position p2.

In this embodiment, a first preset threshold $S_1$ is equal to the preset threshold $Q_4$.

During practical application, $Q_1$, $Q_2$, $Q_3$, $Q_4$, $v_1$, $v_2$, $v_3$, $v_4$, $v_5$, and k may be set according to a requirement and may be dynamically changed, to meet a flexible control requirement. In some embodiments, $v_1 < v_2 < v_3 < v_4 \le v_5$. In this embodiment, controlling of the virtual control component is set to four segmentations, which discretely controlling in different statuses. Such as: when a moving distance of the user is in range of 0 through $Q_1$, the base does not move and the animal Y moves at the velocity $v_1$; when the distance is in range of $Q_1$ through $Q_2$, the base does not move and the animal Y moves at the velocity $v_2$; when the distance is in range of $Q_2$ through $Q_3$, the base does not move and the animal Y moves at the velocity $v_3$; when the distance is in range of $Q_3$ through $Q_4$, the base does not move and the animal Y moves at the velocity $v_4$; when the distance is greater than or equal to $Q_4$, the animal Y moves at the velocity $v_5$ and the base moves with the operation portion. The movement of animal Y corresponds to different feedbacks in cases of different moving distances. A larger moving distance may indicate a large velocity of the animal Y, so that a control status of a real joystick is more accurately simulated, thereby improving the sense of reality of the virtual control component, and increasing the flexibility of the virtual control component.

Figure 7:
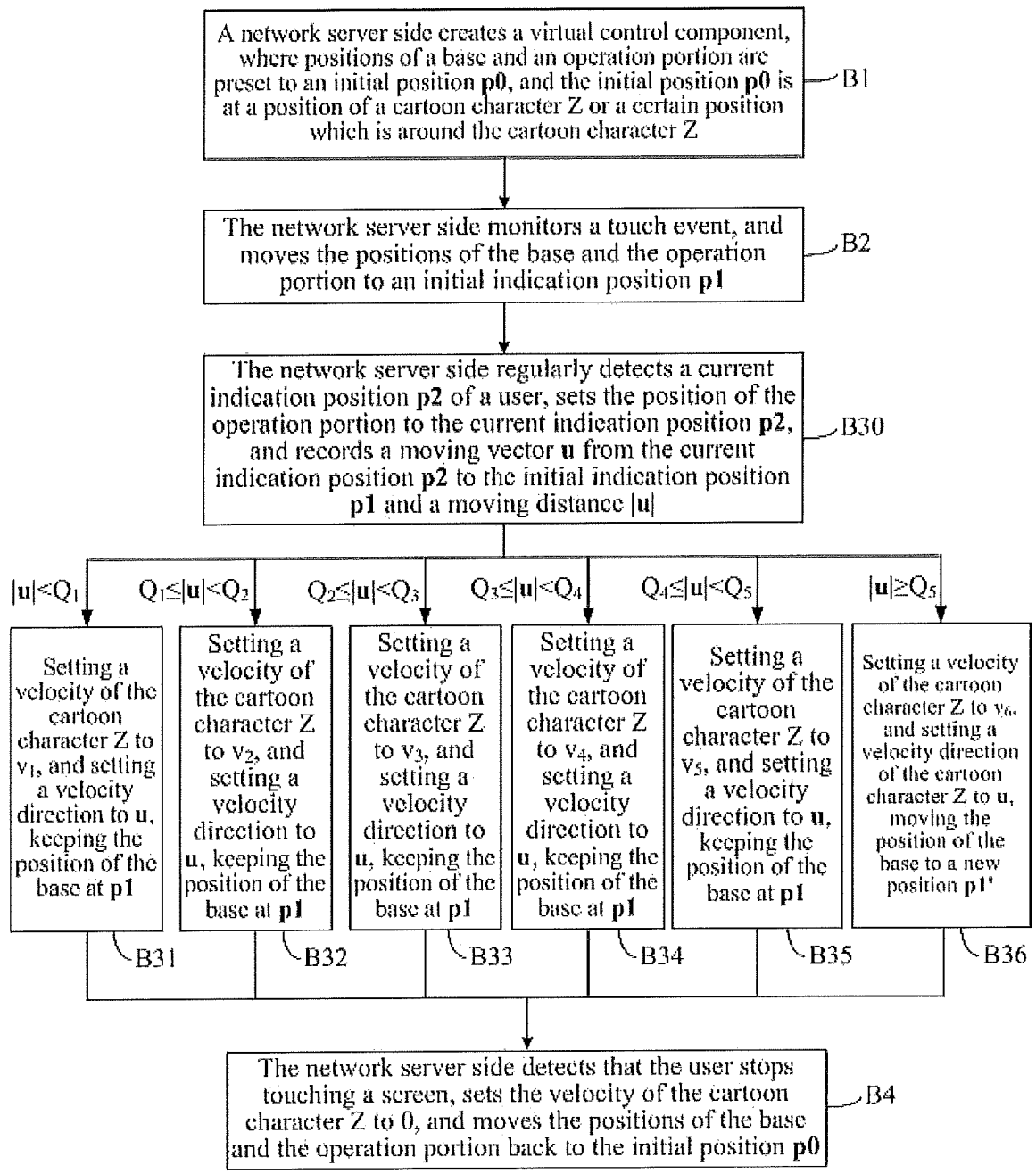
FIG. 7 is a flowchart of controlling a virtual control component according to Embodiment 5 of the present application.

As shown in FIG. 7, FIG. 7 is a flowchart of a method for controlling a virtual control component according to Embodiment 5 of the present application. In this embodiment, the virtual control component is used by a user for controlling a cartoon character Z in an online game on a touchscreen of mobile phone. The virtual control component comprises a base and an operation portion, and the control method comprises the following steps:

B1. A network server side creates the virtual control component, where positions of the base and the operation portion are preset to an initial position p0, and the initial position p0 is at a position of the cartoon character Z or a certain position which is around the cartoon character Z.

B2. The network server side monitors a touch event, and when the user performs a touch-and-press operation in an initial indication position p1 within a range of a mobile phone screen, moves the positions of the base and the operation portion to the initial indication position p1.

B30. During a period of touching the mobile phone screen by the user, the network server side regularly detects a current indication position p2 of the user, presets the position of the operation portion to the current indication position p2, records a moving vector u from the current indication position p2 to the initial indication position p1 and a moving distance $|u|$, where $u=p2-p1$, and $|u|=|p2-p1|$, and compares the moving distance $|u|$ with preset thresholds $Q_1$, $Q_2$, $Q_3$, $Q_4$, and $Q_5$, which further comprising:

B31. When $|u|<Q_1$, setting a velocity of the cartoon character Z to $v_1$, and setting a velocity direction of the cartoon character Z to u, keeping the position of the base at the initial indication position p1.

B32. When $Q_1 \leq |u|<Q_2$, setting a velocity of the cartoon character Z to $v_2$, and setting a velocity direction of the cartoon character Z to u, keeping the position of the base at the initial indication position p1.

B33. When $Q_2 \leq |u|<Q_3$, setting a velocity of the cartoon character Z to $v_3$, and setting a velocity direction of the cartoon character Z to u, keeping the position of the base at the initial indication position p1.

B34. When $Q_3 \leq |u|<Q_4$, setting a velocity of the cartoon character Z to $v_4$, and setting a velocity direction of the cartoon character Z to u, keeping the position of the base at the initial indication position p1.

B35. When $Q_4 \leq |u|<Q_5$, setting a velocity of the cartoon character Z to $v_5$, and setting a velocity direction of the cartoon character Z to u, keeping the position of the base at the initial indication position p1.

B36. When $|u| \geq Q_5$, set a velocity of the cartoon character Z to $v_6$, and setting a velocity direction of the cartoon character Z to u, moving the position of the base to a new position p1', where $p1'=p2-u/|u|*S_3*k$, and k is a preset constant and k>0, and updating the initial indication position p1 to the new position p1'.

B4. The network server side detects that the user stops touching the screen, sets the velocity of the cartoon character Z to 0, and moves the positions of the base and the operation portion back to the initial position p0.

In this embodiment, the indication position is a touch position of a user, the positions of the operation portion of the virtual control component are respectively a first visual reference identifier and a second visual reference identifier that are used by the user for observing coordinates of the user initial indication position p1 and the user current indication position p2.

In this embodiment, a first preset threshold $S_1$ is equal to the preset threshold $Q_5$.

During practical application, $Q_1$, $Q_2$, $Q_3$, $Q_4$, $Q_5$, $v_1$, $v_2$, $v_3$, $v_4$, $v_5$, and $v_6$ may be set according to a requirement and may be dynamically changed, to meet a flexible control requirement. In some embodiments, $v_1<v_2<v_3<v_4<v_5 \leq v_6$. In this embodiment, controlling of the virtual control component is set to five segmentations, which discretely controlling in different statuses. Such as: when a touch moving distance of the user is in range of 0 through $Q_1$, the base does not move and the cartoon character Z moves at the velocity $v_1$; when the distance is in range of $Q_1$ through $Q_2$, the base does not move and the cartoon character Z moves at the velocity $v_2$; when the distance is in range of $Q_2$ through $Q_3$, the base does not move and the cartoon character Z moves at the velocity $v_3$; when the distance is in range of $Q_3$ through $Q_4$, the base does not move and the cartoon character Z moves at the velocity $v_4$; when the distance is in range of $Q_4$ through $Q_5$, the base does not move and the cartoon character Z moves at the velocity $v_5$; when the distance is greater than or equal to $Q_5$, the cartoon character Z moves at the velocity $v_6$ and the base moves with the operation portion. The movement of cartoon character Z corresponds to different feedbacks in cases of different moving distances. A larger moving distance may indicate a larger velocity of the cartoon character Z, so that a control status of a real joystick is more accurately simulated, thereby improving the sense of reality of the virtual control component, and increasing the flexibility of the virtual control component.

In the present application, when the moving distance of the current indication position of the user relative to the initial indication position is greater than a value, not only the position of the base of the virtual control component moves with the operation portion, but also the initial indication position moves with the operation portion. After the initial indication position is updated, the moving distance also needs to be re-calculated, so that the user controls the game character without being restricted and performs operations more fluently. In addition, compared with the prior art, in which the sliding operation of a user has to be performed around a user initial indication position when the user wants to change a direction of a game character. However, in the present invention, sliding operation only needs to be performed around an updated user initial indication position, so that a distance by which sliding needs to be performed when the game character changes the direction is greatly shortened, and the user performs more convenient and flexible operations in a control process, thereby greatly improving the user experience.

The method for controlling a virtual control component in the present application may alternatively be set to six or more segmentations according to requirements of different users, so as to satisfy various requirements of various users, thereby improving the user experience of the users.

In some other embodiments, N may be set to an infinite integer, and $v_1<v_2<\ldots<v_N \leq v_{N+1}$, so that the controlling of a controlled object corresponding to a touch behavior will be present to a progressive effect, and therefore, controlling of the virtual control component is more realistic.

Although the present application is described above in further detail through specific preferred embodiments, the present application is not limited to the specific embodiments. It should be understood by persons skilled in the art that any equivalent replacement or obvious variations made without departing from the spirit of the present application and having same performance or applications shall fall within the protection scope of the present application.

What is claimed is:

1. A method for controlling a game character, comprising:
   obtaining a user initial indication position p1 in response to a screen-sliding operation of a user;
   monitoring a screen-sliding operation track of the user, and obtaining a user current indication position p2;
   calculating a moving distance between the user current indication position p2 and the user initial indication position p1 as $|u|=|p2-p1|$;
   comparing the moving distance $|u|$ with a first preset threshold $S_1$, when the moving distance $|u|$ is greater than the first preset threshold $S_1$, calculating a new position via $p1'=p2-(p2-p1)/|u|*S_1*k$, wherein k is a preset constant and k>0, and updating the user initial indication position p1 to the new position p1'; and
   generating, according to the vector $u=p2-p1$, an operating instruction for controlling the game character, wherein the operating instruction comprises the controlled game character moving at a preset velocity and a value of at least one attribute of the controlled game character has a positive correlation with $|u|$.

2. The method for controlling a game character according to claim 1, wherein the generating, according to the vector u, the operating instruction for controlling the game character comprises:

comparing the moving distance |u| with a second preset threshold $S_2$; and if $|u|<S_2$, generating a first operating instruction for controlling the game character: the controlled game character moves at a first velocity $v_1$, wherein the velocity $v_1$ is codirectional with the vector u; or if $|u|\geq S_2$, generating a second operating instruction for controlling the game character: the controlled game character moves at a second velocity $v_2$, wherein the velocity $v_2$ is codirectional with the vector u, wherein $|v_2|>|v_1|$.

3. The method for controlling a game character according to claim 1, wherein the generating, according to the vector $u=p2-p1$, the operating instruction for controlling the game character comprises:

comparing the moving distance |u| with N preset thresholds $Q_1$, $Q_2$, and $Q_3$; and if $|u|<Q_1$, generating a first operating instruction for controlling the game character: the controlled game character moves at a first velocity $v_1$, wherein the velocity $v_1$ is codirectional with the vector u; or if $Q_1\leq |u|<Q_2$, generating a second operating instruction for controlling the game character: the controlled game character moves at a second velocity $v_2$, wherein the velocity $v_2$ is codirectional with the vector u; or if $Q_2\leq |u|<Q_3$, generating a third operating instruction for controlling the game character: the controlled game character moves at a third velocity $v_3$, wherein the velocity $v_3$ is codirectional with the vector u;

wherein $|v_3|>|v_2|>|v_1|$.

4. The method for controlling a game character according to claim 3, wherein $|v_1|=0$.

5. The method for controlling a game character according to claim 1, wherein the operating instruction comprises: the controlled game character moves at a velocity $v=w*|u|$, wherein w is a preset correlation coefficient, and the velocity v is codirectional with the vector u.

6. The method for controlling a game character according to claim 1, wherein attribute parameters of the controlled game character comprise: vitality, an attack power, a defensive power, and sensitivity.

7. The method for controlling a game character according to claim 1, wherein the screen-sliding operation is a continuous control action on an electronic apparatus, which comprises: one or more of action of touching and continuous sliding on a touchscreen, action of clicking and dragging of a mouse, and continuous sensing and sliding of a sensing operation.

8. The method for controlling a game character according to claim 1, wherein the obtaining the user initial indication position p1 further comprises: providing a first visual reference identifier used by the user for observing coordinates of the user initial indication position p1.

9. The method for controlling a game character according to claim 8, wherein the monitoring the screen-sliding operation track of the user, and obtaining the user current indication position p2 further comprises: providing a second visual reference identifier used by the user for observing coordinates of the user current indication position p2.

10. A method for controlling a virtual control component, the virtual control component being used for controlling a game character, wherein the virtual control component comprises a base and an operation portion, and the control method comprises:

creating the virtual control component, and presetting positions of the base and the operation portion as an initial position;

obtaining a user initial indication position p1 in response to a screen-sliding operation of a user, and moving the positions of the base and the operation portion to the user initial indication position p1;

monitoring a screen-sliding operation track of the user, and obtaining a user current indication position p2, and moving the operation portion with the screen-sliding operation track;

calculating a moving distance between the user current indication position p2 and the user initial indication position p1 as $|u|=|p2-p1|$;

comparing the moving distance |u| with a preset threshold $S_1$, when the moving distance |u| is greater than the preset threshold $S_1$, calculating a new position via $p1'=p2-(p2-p1)/|u|*S_1*k$, wherein k is a preset constant and k>0, updating the user initial indication position p1 to the new position p1', and moving the position of the base to the new position p1'; and generating, according to the vector $u=p2-p1$, an operating instruction for controlling the game character, wherein the operating instruction comprises the controlled game character moving at a preset velocity, and a value of at least one attribute parameter of the controlled game character has a positive correlation with |u|.

11. The method for controlling a virtual control component according to claim 10, further comprising:

setting a velocity of the controlled game character to 0 in response to ending of the screen-sliding operation, and moving the positions of the base and the operation portion to the initial position.

* * * * *